United States Patent [19]

Thiersault et al.

[11] Patent Number: 4,786,688

[45] Date of Patent: Nov. 22, 1988

[54] POLYETHYLENE COMPOSITION FOR EXTRUSION, PARTICULARLY FOR BLOW MOULDING

[75] Inventors: Jean P. Thiersault; Daniel Durand, both of Martigues; Alain Senez, Callas-Cabriès, all of France

[73] Assignee: BP Chimie, Lavera, France

[21] Appl. No.: 149,913

[22] Filed: Jan. 27, 1988

Related U.S. Application Data

[63] Continuation of Ser. No. 780,710, Sep. 26, 1985, abandoned, which is a continuation of Ser. No. 663,829, Oct. 23, 1984, abandoned, which is a continuation of Ser. No. 319,191, Nov. 9, 1981, abandoned.

[30] Foreign Application Priority Data

Nov. 13, 1980 [FR] France ................. 80 24096

[51] Int. Cl.⁴ .................. C08L 23/04; C08L 23/06; C08L 23/20
[52] U.S. Cl. .................................... 525/240
[58] Field of Search ........................... 525/240

[56] References Cited

U.S. PATENT DOCUMENTS

| | | | |
|---|---|---|---|
| 3,176,052 | 3/1965 | Peticolas | 525/240 |
| 3,231,636 | 1/1966 | Snyder et al. | 525/240 |
| 3,998,914 | 12/1976 | Lillis et al. | 525/240 |
| 4,076,698 | 2/1978 | Anderson et al. | 526/348.6 |
| 4,303,710 | 12/1981 | Bullard et al. | 525/240 |

FOREIGN PATENT DOCUMENTS

| | | | |
|---|---|---|---|
| 2405961 | 5/1979 | France . | |
| 55-082140 | 6/1980 | Japan | 525/324 |
| 815805 | 7/1959 | United Kingdom | 525/240 |

OTHER PUBLICATIONS

Plastics World—"New Materials", Dec. 1979.
Package Engineering—"New Polyethylenes", Feb. 1980.
Modern Plastics—Nov. 1979, p. 61.
Sclair—DuPont—10/80.

*Primary Examiner*—Carman J. Seccuro
*Attorney, Agent, or Firm*—Brooks Haidt Haffner & Delahunty

[57] ABSTRACT

The invention concerns polyethylene compositions particularly adapted for the manufacture of film and hollow bodies by blow-moulding, characterized in that they contain
(a) from 50 to 98% by weight of polyethylene of high density, of at least 0.940
(b) from 2 to 50% by weight of a linear, low density polyethylene, with a density below 0.930.

6 Claims, No Drawings

POLYETHYLENE COMPOSITION FOR EXTRUSION, PARTICULARLY FOR BLOW MOULDING

This application is a continuation of application Ser. No. 780,710, filed Sept. 26, 1985, now abandoned, which is a continuation of application Ser. No. 663,829, filed Oct. 23, 1984, now abandoned, which is a continuation of application Ser. No. 319,191, filed Nov. 9, 1981, now abandoned.

The invention concerns improved polyethylene compositions, particularly adapted to the manufacture of various articles by normal extrusion methods, and specially adapted to the manufacture of hollow bodies and films by blow-moulding.

It is already known—particularly in the manufacture of milk bottles by blow-moulding—to use mixtures of a polyethylene obtained by a low pressure process (generally below $4 \times 10^6$ Pa) and having a density of over 0.940, and a polyethylene obtained by radical polymerisation of ethylene at high pressure (generally over $10^8$ Pa) known as "high pressure polyethylene" having a density below 0.930; the mixtures generally contain from 10 to 50% by weight of high pressure polyethylene.

The mixtures have various advantages over high density polyethylene, such as improved flexibility and easier use. However, they do have certain disadvantages, such as relatively poor impact strength and resistance to cracking under tension.

Applicants have now discovered compositions essentially comprising high density polyethylene and some copolymers of ethylene and one or more other alpha-olefins of the type generally described as linear low density polyethylene (LLDP). These compositions have excellent flexibility and are extremely easy to use, without having any of the drawbacks of the mixtures mentioned above.

The invention thus concerns polyethylene compositions with improved properties, comprising:
(a) from 50 to 98% by weight of high density polyethylene, with a density of at least 0.940
(b) from 2 to 50% by weight of linear low density polyethylene, with a density below 0.930.

The polyethylene of high density, at least 0.940, included in the compositions of the invention, may be prepared by one of the known low pressure polymerising methods, e.g. at a pressure below $4 \times 10^6$ Pa, in the presence of a catalyst containing a compound of a transition metal from sub-groups IVa, Va and VIa of the Periodic Table, the catalyst generally being activated by an organo-metallic compound such as an organoaluminium compound. The high density polyethylene may be prepared either by homopolymerising ethylene or by copolymerising at least 96% by weight of ethylene with at most 4% by weight of one or more upper alpha-olefins containing three to 8 carbon atoms, such as propylene or 1-n-butene.

The linear low density polyethylene with a density below 0.930 included in the compositions may be obtained by copolymerising 85 to 95% by weight of ethylene with 5 to 15% by weight of one or more upper alpha-olefins containing 3 to 8 carbon atoms, selected chiefly from propylene, 1-n-butene, 1-n-hexene, 4-methyl-1-pentene or 1-n-octene. Copolymerisation of the mixture of the monomers may be carried out by one of the known low pressure processes, particularly at a pressure below $4.10^6$ Pa, in the presence of a catalyst containing a transition metal compound as defined above.

The linear low density polyethylene can preferably be prepared by copolymerisation in the gas phase. In particular, it may advantageously be prepared by the method of copolymerising ethylene and an upper alpha-olefin in a fluidised bed, described in French Pat. No. 2 405 961.

It has been found that linear low density polyethylene prepared by this method of copolymerisation in the gas phase in fact has a special structure, and thus gives the compositions of the invention striking and advantageous properties.

The structure can be demonstrated particularly by differential enthalpy analysis, which shows the linear low density polyethylenes to have a crystalline phase with a melting point above 115° C., and also a relatively large amorphous phase with a broad fusion range below 115° C.

The constituents of the compositions of the invention are preferably blended in the melted state. An effective method comprises first blending the constituents in the solid state, in granule or powder form, then completing the mixing process in the melted state in the usual type of machine such as a single screw or twin screw extruder, and following up these operations with a granulation step. In some cases blending in the melted state may be carried out in the actual conversion machines, using the granulated or powdered constituents which have previously been mixed in the solid state.

In order to obtain more homogeneous blends of the constituents of the compositions of the invention, the melt index (measured by French Standard NF T 51016) of the linear low density polyethylene is preferably equal to or above one fourth of the melt index of the high density polyethylene.

Furthermore when the compositions of the invention are used by extruding or blow-moulding methods, particularly for producing bottles or films, the melt index of the linear low density polyethylene is still more preferably equal to or above the melt index of the high density polyethylene. So it is possible to obtain bodies having better surface aspect and to avoid fish-eyes production.

Without imposing any restrictions, the examples which follow illustrate the advantages of the compositions of the invention over previously known mixtures. The polyethylenes used in the examples have the following properties:

High density polyethylene, homopolymer, trademark NATENE 60020 AG (examples 1 and 2)
  Density: 0.960
  Melt index at 5 kg and 190° C.: 1.2
  Melt index at 2.16 kg and 190° C.: 0.2
High density polyethylene, trademark NATENE 54000 FB, copolymer of ethylene and 1-n-butene (example 3)
  Content of groups derived from 1-n-butene: 0.6% by weight
  Density: 0.954
  Melt index at 8.5 kg and 190° C.: 1.2
  Melt index at 2.16 kg and 190° C.: <0.1
Linear low density polyethylene, trademark NATENE BD 404, copolymer of ethylene and 1-n-butene, prepared by a fluidised bed process (examples 1, 2 and 3)
  Content of groups derived from 1-n-butene: 13.8% by weight Density: 0.913
Melt index at 2.16 kg and 190° C.: 0.55
Bending strength: 21 MPa
Melting enthalpy: −117 J/g
High pressure polyethylene (HP polyethylene) (examples 1, 2, 3)
Density: 0.920
Melt index at 2.16 kg and 190° C.: 0.7

EXAMPLE 1

A composition (A) according to the invention, containing 95% by weight of high density polyethylene "NATENE 60020 AG" and 5% by weight of LLDP "NATENE BD 404", is prepared by mixing in a twin screw Werner 28 granulator operating at a temperature of 200° C. and with the screw rotating at 200 revolutions per minute. Another composition (B) is made by way of comparison, containing 95% by weight of "NATENE 60020 AG" and 5% by weight of high pressure polyethylene.

The mechanical properties of the two compositions, measured on moulded slabs, are given in table I, together with those of the high density polyethylene "NATENE 60020 AG".

Composition (A) according to the invention is found to have far greater impact strength at 23° C. than composition (B) containing high pressure polyethylene or high density polyethylene "NATENE 60020 AG" alone.

Composition (A) is also found to have greater resistance to cracking under tension on moulded articles, or greater stress-cracking strength in accordance with ASTM D 1693 than composition (B) or the high density polyethylene "NATENE 60020 AG".

One liter bottles weighing 35 g are made with each of the above-defined compositions (A) and (B), by extrusion blow-moulding on a Fischer machine with a diameter of 50 mm. Their resistance to longitudinal compression is shown in table II.

The compatibility of "NATENE BD 404" with the high density polyethylene "NATENE 60020 AG" enables composition (A) to retain virtually the same rigidity as the high density polyethylene. On the other hand, there is a big loss of rigidity with the bottles made with composition (B) containing the high pressure polyethylene.

As far as the use of the materials is concerned, no differences are noted between the two compositions (A) and (B) and the high density polyethylene alone, except that the compositions (A) and (B) swell more in the die.

EXAMPLE 2

Compositions (C) and (D), containing firstly 80% by weight of high density polyethylene "NATENE 60020 AG" and, secondly, 20% by weight of linear low density polyethylene "NATENE BD 404" and 20% by weight of high pressure polyethylene respectively, are made in a twin screw Werner 28 granulator operating at 200° C. with the screw rotating at 200 rpm.

Measurements of resistance to stress-cracking (in accordance with ASTM D 1693) taken on moulded articles show the very clear superiority of composition (C) containing low linear density polyethylene "NATENE BD 404". The readings are given in table III.

EXAMPLE 3

A composition (E) containing 80% by weight of "NATENE 54000 FB" and 20% by weight of "NATENE BD 404" is made by mixing the constituents in granulated form. The composition is extruded in the form of a sheathing film 20 microns thick, under the following conditions:
Extruder SEMIVEX: screw diameter 45 mm.
Extruding temperature: 200° C.
Rotary speed of screw: 60 revolutions per minute.
Swelling rate (diameter of bubble/diameter of die): 3.9.
Height of crystallisation line (height corresponding to passage from melted to crystalline state, generally indicated by sudden reduction in transparency of film): 90 cms.
Width when flat: 35 cms.
Drawing speed: 16 m/min.

The properties of mixture (F), containing 80% by weight of "NATENE 54000 FB" and 20% by weight of high pressure polyethylene, then those of "NATENE 54000 FB" are studied under the same conditions to provide a comparison. The mechanical properties of the films are given in table IV.

As compared with the high density polyethylene "NATENE 54000 FB", composition (E) according to the invention containing "NATENE BD 404" has greatly improved resistance to perforation of the film. Composition (F), containing 20% by weight of high pressure polyethylene, retains good tearing strength in the film but its resistance to perforation is then very low.

TABLE I

| | Mechanical properties | | | | |
|---|---|---|---|---|---|
| | Density | Melt index at 5 kg and 190° C. | Bending strength (MPa) | Charpy impact strength, attacked at 23° C. $(KJ/m^2)$ | Stress-cracking strength (Standard ASTM D 1963) |
| Composition (A) 95% "NATENE 60020 AG" 5% "NATENE BD 404" | 0.957 | 1.4 | 58 | 12 | 10 |
| Composition (B) 95% "NATENE 60020 AG" 5% HP polyethylene | 0.957 | 1.2 | 58 | 7 | 8 |
| "NATENE 60020 AG" | 0.960 | 1.2 | 61 | 7 | 6 |

TABLE II

| Rigidity of bottles | |
|---|---|
| | Compressive strength (Kgf) |
| Composition (A) 95% "NATENE 60020 AG" | 26.8 |

TABLE II-continued

| Rigidity of bottles | |
|---|---|
| | Compressive strength (Kgf) |
| 5% "NATENE BD 404" Composition (B) 95% "NATENE 60020 AG" | 23.9 |
| 5% HP polyethylene "NATENE 60020 AG" | 27 |

TABLE III

Mechanical properties

| | Density | Melt Index at 5 kg and 190° C. | Bending strength (MPa) | Stress-cracking strength (standard ASTM D 1693) (h) |
|---|---|---|---|---|
| Composition (C) 80% NATENE 60020 AG 20% NATENE BD 404 | 0,951 | 1,5 | 50 | 20 |
| Composition (D) 80% NATENE 60020 AG 20% Polyethylene HP | 0,952 | 1,55 | 50 | 2 |
| NATENE 60020 AG | 0,960 | 1,2 | 61 | 6 |

TABLE IV

Properties of films

| | Density | Melt index at 8.5 kg and 190° C. | Tensile strength direction of machine (MPa) | Elongation direction of machine (%) | Tearing strength expressed as that for thickness of 25μ (cN) | | Resistance to perforation of film 20μ thick (dJ) |
|---|---|---|---|---|---|---|---|
| | | | | | direction of machine | transverse direction | |
| Composition (E) 80% NATENE 54000 FB 20% NATENE BD 404 | 0,946 | 1,37 | 26 | 400 | 47 | 1 075 | 22 |
| Composition (F) 80% NATENE 54000 FB 20% Polyethylene HP | 0,947 | 1,48 | 25,5 | 300 | 55 | 1 600 | 5 |
| NATENE 54000 FB | 0,954 | 1,2 | 29 | 350 | 48 | 810 | 14 |

The various properties quoted were measured in accordance with the following standards:

| Measurements | French Standard (NF) |
|---|---|
| Melt index | NF T 51016 |
| Density | NF T 51063 |
| Tensile strength | NF T 51034 |
| Charpy impact strength | NF T 51035 |
| Special measurements on films | |
| Tearing strength | NF T 54108 |
| Resistance to perforation | NF T 54109 |

We claim:

1. Polyethylene compositions, characterised in that they contain:
  (a) from 80 to 98% by weight of high density polyethylene having a density of at least 0.940, a melt index measured at 190° C. under a load of 5 kg (MI$_5$) of 1.2 g/10 minutes or less, and a melt flow ratio defined by the ratio of MI$_5$ to a melt index measured at 190° C. under a load of 2.16 kg, of 6 or higher,
  (b) from 2 to 20% by weight of linear low density polyethylene, of a density below 0.930 and a melt index of at least one-fourth the melt index of the high density polyethylene which is formed by copolymerizing 85 to 95% by weight ethylene with 15 to 5% by weight of one or more C$_3$-C$_8$ alpha-olefins, in the gaseous phase at a pressure below $4 \times 10^6$ Pa in the presence of a catalyst containing compound of a transition metal selected from the sub-groups IVa, Va and VIa of the Periodic Table, wherein the compositions have a melt index measured at 190° under a load of 2.16 kg of 0.12 g/10 min or higher.

2. The composition of claim 1, wherein the high density polyethylene is obtained by polymerising ethylene or by copolymerising at least 96% by weight of ethylene with at most 4% by weight of an alpha-olefin containing 3 to 8 carbon atoms, and wherein the polymerisation or copolymerisation is carried out at a pressure below $4 \times 10^6$ Pa, in the presence of a catalyst containing a compound of a transition metal from sub-groups IVa, Va and VIa of the Periodic Table.

3. The compositions of claim 1, wherein the linear low density polyethylene is obtained by copolymerization of a mixture of ethylene and one or more upper alpha-olefins, selected from from the group consisting of propylene, 1-n-butene, 1-n-hexene, 4-methyl-1-pentene and 1-n-octene.

4. The compositions of claim 1 wherein the linear low density polyethylene is produced by polymerization in the gaseous phase in a fluidized bed.

5. A polyethylene composition comprising:
  (a) from 80 to 98% by weight of high density polyethylene having a density of at least 0.940, a melt index measured at 190° C. under load of 5 kg (MI$_5$) of 1.2 g/10 minutes or less, and a melt flow ratio defined by the ratio of MI$_5$ to a melt index measured at 190° C. under a load of 2.16 kg, of 6 or higher,
  (b) from 2 to 20% by weight of linear low density polyethylene, of a density below 0.930 and a melt index of at least one-fourth the melt index of the high density polyethylene and which is formed by copolymerizing 85 to 95% by weight ethylene with 15 to 5% by weight of an alpha-olefin selected from the group consisting of propylene and 1-n-butene in the gaseous phase in a fluidized bed at a pressure below $4 \times 10^6$ Pa in the presence of a catalyst containing compound of a transition metal selected from the subgroups IVa, Va and VIa of the Periodic Table, wherein the compositions have a melt index measured at 190° C. under a load of 2.16 kg of 0.12 g/10 min or higher.

6. Polyethylene compositions consisting essentially of:
  (a) from 80 to 98% by weight of high density polyethylene having a density of at least 0.940, a melt index measured at 190° C. under a load of 5 kg ($MI_5$) of 1.2 g/10 minutes or less, and a melt flow ratio defined by the ratio of $MI_5$ to a melt index measured at 190° C. under a load of 2.16 kg, of 6 or higher,
  (b) from 2 to 20% by weight of linear low density polyethylene, of a density below 0.930 and a melt index of at least one-fourth the melt index of the high density polyethylene and which is formed by copolymerizing 85 to 95% by weight ethylene with 15 to 5% by weight of one or more $C_3$–$C_8$ alpha-olefins in the gaseous phase in a fluidized bed at a pressure below $4 \times 10^6$ Pa in the presence of a catalyst containing compound of a transition metal selected from the subgroups IVa, Va, and VIa of the Periodic Table, wherein the compositions have a melt index measured at 190° C. under a load of 2.16 kg of 0.12 g/10 minutes or higher.

* * * * *